US012263132B2

(12) United States Patent
Li

(10) Patent No.: US 12,263,132 B2
(45) Date of Patent: Apr. 1, 2025

(54) PERISTALTIC DEVICE AND MASSAGER

(71) Applicants: Beston (Shenzhen) Technology Co., LTD., Shenzhen (CN); Shenzhen Winyi Technology Co.,Ltd, ShenZhen (CN)

(72) Inventor: Lerong Li, Shenzhen (CN)

(73) Assignees: Beston (Shenzhen) Technology Co., LTD., Shenzhen (CN); Shenzhen Winyi Technology Co.,Ltd., Shenzhen (CN)

( * ) Notice: Subject to any disclaimer, the term of this patent is extended or adjusted under 35 U.S.C. 154(b) by 0 days.

(21) Appl. No.: 18/914,078

(22) Filed: Oct. 12, 2024

(65) Prior Publication Data

US 2025/0032348 A1 Jan. 30, 2025

(30) Foreign Application Priority Data

Sep. 24, 2024 (CN) ......................... 202422337946.9

(51) Int. Cl.
*A61H 19/00* (2006.01)
*A61H 15/00* (2006.01)
*A61H 23/00* (2006.01)

(52) U.S. Cl.
CPC ......... *A61H 15/0078* (2013.01); *A61H 23/00* (2013.01); *A61H 19/44* (2013.01); *A61H 2201/1481* (2013.01)

(58) Field of Classification Search
CPC ........ A61H 19/00; A61H 19/40; A61H 19/44; A61H 2201/1669; A61H 2201/1215; A61H 2201/149; A61H 23/02; A61H 15/00; A61H 1/00
See application file for complete search history.

(56) References Cited

U.S. PATENT DOCUMENTS

| | | | | |
|---|---|---|---|---|
| 7,438,681 B2 * | 10/2008 | Kobashikawa ........ | A61H 19/32 | 600/38 |
| 8,366,646 B2 * | 2/2013 | Knyrim .............. | A61H 23/0254 | 600/38 |
| 8,419,664 B2 * | 4/2013 | Knyrim .................. | A61H 19/44 | 600/38 |
| 2003/0093016 A1 * | 5/2003 | Chen ...................... | A61H 19/44 | 601/127 |
| 2006/0047181 A1 * | 3/2006 | Hsu ........................ | A61H 21/00 | 600/38 |
| 2007/0142754 A1 * | 6/2007 | Nan ....................... | A61H 19/44 | 601/72 |

(Continued)

*Primary Examiner* — Justine R Yu
*Assistant Examiner* — Christopher E Miller

(57) ABSTRACT

A peristaltic device and a massager are provided. A mounting base is mounted on a side of a sliding seat facing away from a main body. A transmission rod has one end connected to an end of a driving rod away from the main body and the other end passing through the mounting base. A peristaltic sheet group is movably arranged on a side of the mounting base facing away from the sliding seat. The driving rod can rotate relative to the main body, such that the sliding seat drives a peristaltic assembly to move, and the transmission rod rotates and drives the peristaltic sheet group to wriggle. The peristaltic device of the present disclosure can perform telescopic motion in a peristaltic process, thereby promoting user experience.

20 Claims, 9 Drawing Sheets

(56) References Cited

U.S. PATENT DOCUMENTS

| | | | | |
|---|---|---|---|---|
| 2007/0179336 | A1* | 8/2007 | Knyrim | A61H 21/00 600/38 |
| 2009/0099413 | A1* | 4/2009 | Kobashikawa | A61H 19/44 600/38 |
| 2016/0262973 | A1 | 9/2016 | Giraud et al. | |
| 2016/0354277 | A1* | 12/2016 | Fima | A61H 19/44 |
| 2017/0100303 | A1* | 4/2017 | Kotlov | A61H 21/00 |
| 2020/0260834 | A1 | 8/2020 | Lee | |
| 2024/0009070 | A1 | 1/2024 | Yarro et al. | |

* cited by examiner

PERISTALTIC DEVICE AND MASSAGER

CROSS-REFERENCE TO RELATED APPLICATIONS

This application claims priority to Chinese Patent Application No. 202422337946.9 with a filing date of Sep. 24, 2024. The content of the aforementioned application, including any intervening amendments thereto, is incorporated herein by reference.

TECHNICAL FIELD

The present disclosure relates to the technical field of massage supplies, and in particular, to a peristaltic device and a massager.

BACKGROUND

In massage apparatuses, a peristaltic structure is usually required. A typical peristaltic structure usually includes a driving motor and a plurality of peristaltic sheets. The peristaltic sheet is provided with a driving hole. The driving motor has a driving rod, and the driving rod sequentially passes through the driving holes of the plurality of peristaltic sheets. During use, the rotation of the driving rod can drive the plurality of driving holes to move in a predetermined direction, thereby achieving a peristaltic effect.

However, the above peristaltic structure has only a peristaltic function, which results in a relatively single function and poor users' massage experience of the massage apparatuses.

SUMMARY OF PRESENT INVENTION

Embodiments of the present disclosure provides a peristaltic device to solve the problem that the peristaltic device in the prior art has a single function, resulting in poor user experience.

According to a first aspect, a peristaltic device provided by the embodiments of the present disclosure includes:

- a driving motor, including a main body and a driving rod rotatably connected to the main body;
- a sliding seat, sleeved on the driving rod; and
- a peristaltic assembly, including a transmission rod, a mounting base, and a peristaltic sheet group, where the mounting base is mounted on a side of the sliding seat facing away from the main body, the transmission rod has one end connected to an end of the driving rod away from the main body and the other end passing through the mounting base, the peristaltic sheet group is arranged on a side of the mounting base facing away from the sliding seat and is movable on the mounting base along a first direction, the peristaltic sheet group is provided with a connecting portion, and the connecting portion is inserted into and is connected between two ends of the transmission rod; and
- the driving rod is capable of rotating relative to the main body, such that the sliding seat drives the peristaltic assembly to move in the first direction, and the transmission rod rotates and drives the peristaltic sheet group to wriggle.

In an embodiment, a spiral sliding groove is provided on the driving rod, and a driving member matching the sliding groove is provided on the sliding seat.

In an embodiment, the sliding seat includes a plurality of first guide columns and a seat body, the seat body and the plurality of first guide columns are all arranged around the driving rod, the first guide columns are mounted on the main body and extend in the first direction, and the seat body is slidably connected to the plurality of first guide columns.

In an embodiment, the transmission rod is spiral; the mounting base includes two second guide columns, and the second guide columns extend in the first direction; the peristaltic sheet group includes a plurality of peristaltic sheets arranged in the first direction, each peristaltic sheet includes a center hole and two limiting holes respectively located on two sides of the center hole, and the center holes of the plurality of peristaltic sheets jointly define the connecting portion; the center holes are sequentially sleeved on the transmission rod; and the two limiting holes of each peristaltic sheet are respectively sleeved on the corresponding second guide columns.

In an embodiment, the mounting base further includes a lower blocking cover and an upper blocking cover, the lower blocking cover is connected to the sliding seat, the second guide columns are disposed between the lower blocking cover and the upper blocking cover to define a limiting space, and the limiting space is configured to mount the peristaltic sheet group in a limiting manner.

In an embodiment, the peristaltic device further includes a plurality of massage balls, where the sliding seat includes a peripheral wall facing away from the driving rod, a plurality of fixing grooves are provided on the peripheral wall, the plurality of fixing grooves are arranged at intervals in a circumferential direction of the driving rod, and the massage balls are rotatably connected to walls of the fixing grooves and are partially exposed outside the fixing grooves.

In an embodiment, the peristaltic device further includes a vibrator, where the vibrator is connected to the mounting base, and the vibrator is located on a side of the peristaltic sheet group facing away from the mounting base.

In an embodiment, spacers are provided on the peristaltic sheets, and each spacer is located between two adjacent peristaltic sheets.

In an embodiment, a rotating hole is further provided on the upper blocking cover, and the other end of the transmission rod is rotatably connected into the rotating hole.

According to a second aspect, the embodiments of the present disclosure further provide a massager, including the peristaltic device described in each above embodiment, and a soft casing, where the soft casing is sleeved outside the peristaltic device.

Compared with the prior art, the peristaltic device provided by the embodiments of the present disclosure has the following beneficial effects: the present disclosure can solve the problem that the peristaltic device in the prior art has a single function; and the peristaltic device can perform telescopic motion in a peristaltic process, thereby further enhancing the massage effect and promoting user experience.

Specifically, the main body of the driving motor can drive the driving rod to rotate, and then the driving rod drives the transmission rod to rotate. The transmission rod and the connecting portion implement transmission cooperation to enable the peristaltic sheet group to wriggle. Moreover, the driving rod is sleeved with the sliding seat, and the rotational motion of the driving rod can be converted into reciprocating motion of the sliding seat in the first direction. The mounting base is mounted on the sliding seat, the sliding seat can drive the mounting base to move during movement, and then the peristaltic sheet group on the mounting base is driven to perform telescopic motion relative to the transmission rod, such that the telescopic motion can also be implemented in the peristaltic process. Therefore, the present invention has richer functions and can allow users to experience more diverse massage modes, thereby meeting the needs and preferences of different users, achieving better massage effects and having better competitiveness.

BRIEF DESCRIPTION OF THE DRAWINGS

The specific implementation of the present disclosure will be further described in detail below with reference to the accompanying drawings and specific embodiments. In the drawings.

REFERENCE NUMERALS IN THE DRAWINGS

1000. Massager;
100. Peristaltic device;
10. Driving motor; 11. Main body; 12. Driving rod;
20. Sliding seat; 21. First guide column; 22. Seat body; 23. Fixed seat; 24. Fixing groove;
30. Peristaltic assembly; 31. Transmission rod; 32. Mounting base; 321. Second guide column; 322. Lower blocking cover; 323. Upper blocking cover; 323*a*. Rotating hole; 323*b*. Flange; 324. Connecting rod; 33. Peristaltic sheet group; 331. Connecting portion; 332. Peristaltic sheet; 332*a*. Center hole; 332*b*. Limiting hole; 332*c*. Spacer;
40. Vibrator;
50. Massage ball; and
200. Soft casing.

DETAILED DESCRIPTION OF THE EMBODIMENTS

It should be noted that embodiments in the present disclosure and features in the embodiments may be combined with one another without conflict. The preferred embodiment of the present disclosure is described in detail with reference to the accompanying drawings.

Figure 1:
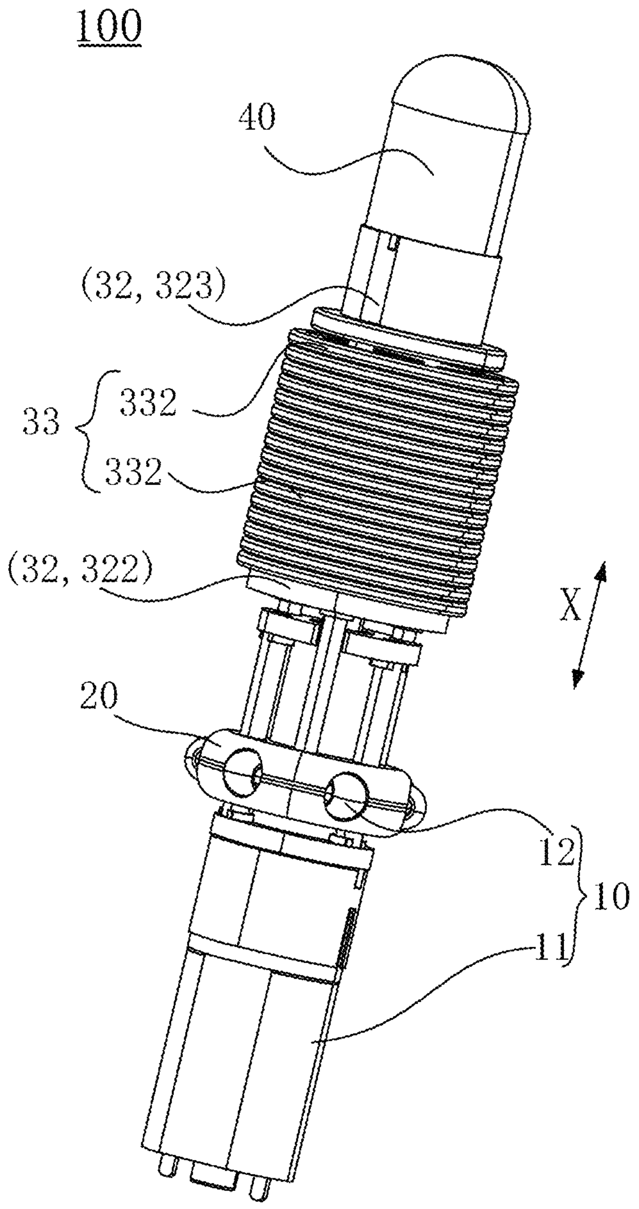
FIG. 1 is a three-dimensional schematic diagram showing a peristaltic device in a retracting state according to embodiments of the present disclosure.
Figure 2:
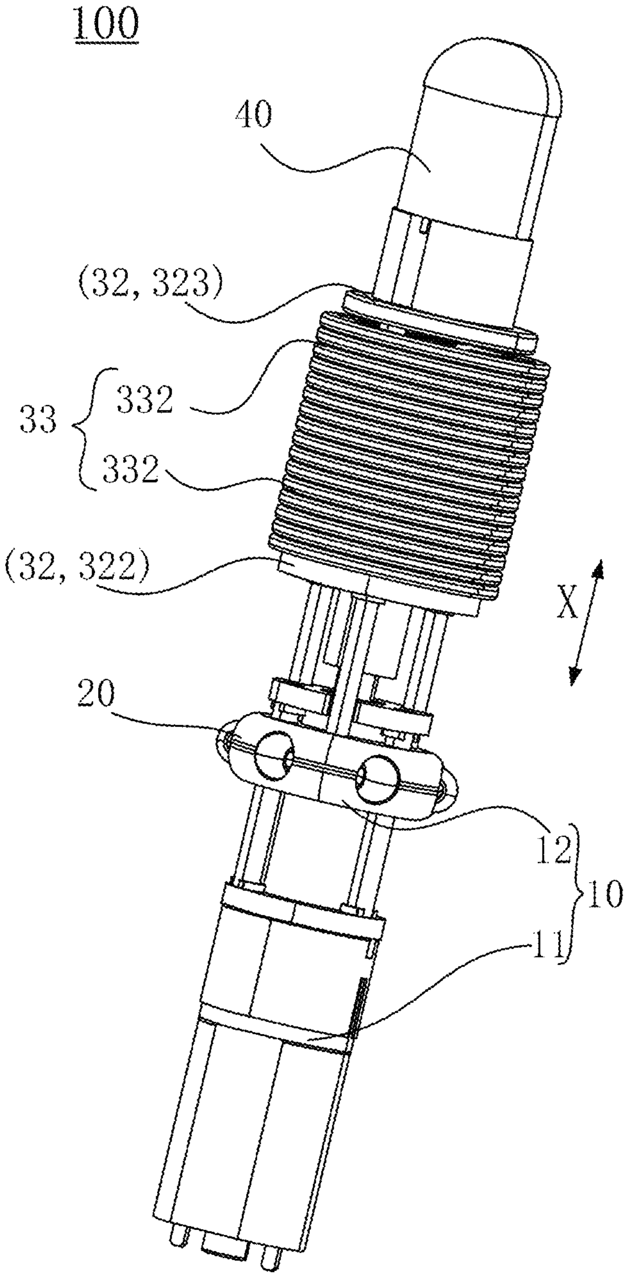
FIG. 2 is a first three-dimensional schematic diagram showing a peristaltic device in a stretching state according to embodiments of the present disclosure.

The embodiments of the present disclosure provide a peristaltic device 100. As shown in FIG. 1 and FIG. 2, the peristaltic device 100 includes a driving motor 10, a sliding seat 20, and a peristaltic assembly 30. The driving motor 10 includes a main body 11 and a driving rod 12 rotatably connected to the main body 11. The sliding seat 20 is sleeved on the driving rod 12. The peristaltic assembly 30 includes a transmission rod 31, a mounting base 32, and a peristaltic sheet group 33. The mounting base 32 is mounted on a side of the sliding seat 20 facing away from the main body 11. The transmission rod 31 has one end connected to an end of the driving rod 12 away from the main body 11 and the other end passing through the mounting base 32. The peristaltic sheet group 33 is arranged on a side of the mounting base 32 facing away from the sliding seat 20 and is movable on the mounting base along a first direction (as shown in an X direction in FIG. 1). The peristaltic sheet group 33 is provided with a connecting portion 331, and the connecting portion 331 is inserted into and is connected between two ends of the transmission rod 31. The driving rod 12 is capable of rotating relative to the main body 11, such that the sliding seat 20 drives the peristaltic assembly 30 to move in the first direction, and the transmission rod 31 rotates and drives the peristaltic sheet group 33 to wriggle. The present disclosure can solve the problem that the peristaltic device 100 in the prior art has a single function; and the peristaltic device 100 can perform telescopic motion in a peristaltic process, thereby further enhancing the massage effect and promoting user experience.

Specifically, the main body 11 of the driving motor 10 can drive the driving rod 12 to rotate, then the driving rod 12 drives the transmission rod 31 to rotate. The transmission rod 31 and the connecting portion 331 implement transmission cooperation to enable the peristaltic sheet group 33 to wriggle. Moreover, the driving rod 12 is sleeved with the sliding seat 20, and the rotational motion of the driving rod 12 can be converted into reciprocating motion of the sliding seat 20 in the first direction. The mounting base 32 is mounted on the sliding seat 20, the sliding seat 20 can drive the mounting base 32 to move during movement, and then the peristaltic sheet group 33 on the mounting base 32 is driven to perform telescopic motion relative to the transmission rod 31, such that the telescopic motion can also be implemented in the peristaltic process. Therefore, the present invention has richer functions and can allow users to experience more diverse massage modes, thereby meeting the needs and preferences of different users, achieving better massage effects and having better competitiveness.

In the present disclosure, there are many ways to connect the driving rod 12 and the sliding seat 20. In an embodiment, the driving rod 12 is a screw (not shown in the drawings), a threaded hole (not shown in the drawings) is provided on the sliding seat 20, and the threaded hole is threadedly connected to the screw. In another embodiment, a spiral sliding groove (not shown in the drawings) is provided on the driving rod 12, and a driving member (not shown in the drawings) matching the sliding groove is provided on the sliding seat 20. With such arrangements, the spiral sliding groove can enable the sliding seat 20 to move a longer distance with the same number of rotations, thereby shortening the round trip time of the sliding seat 20 during linear motion, accelerating the movement speed, increasing the telescopic frequency, and thus enhancing the massage effect.

Figure 3:
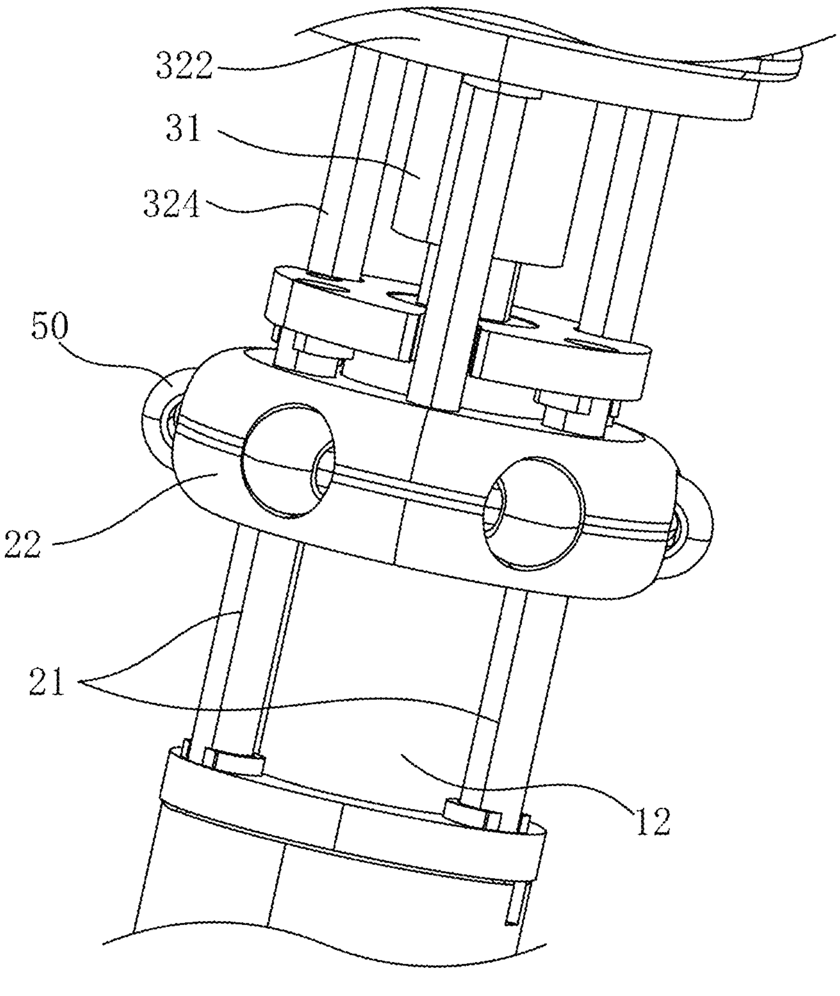
FIG. 3 is a combined schematic diagram showing a sliding seat and a driving motor according to embodiments of the present disclosure.

With reference to FIG. 3, furthermore, the sliding seat 20 includes a plurality of first guide columns 21 and a seat body 22. The seat body 22 is sleeved on the driving rod 12. The plurality of first guide columns 21 are arranged around the driving rod 12, and the first guide columns 21 are mounted on the main body 11 and extend in the first direction. The seat body 22 is slidably connected to the plurality of first guide columns 21. With such arrangements, the first guide columns 21 can provide support and guidance for the seat body 22, such that the seat body 22 achieves better stability during linear motion, and movement deviation and swing are avoided, thereby making the movement of the seat body 22 more stable and smooth, and improving the performance of the peristaltic device 100.

In more specific embodiments, the sliding seat 20 further includes a fixed seat 23. The fixed seat 23 is connected to ends of the plurality of first guide columns 21 away from the main body 11, and the driving rod 12 passes through the fixed seat 23. Thus, both ends of the plurality of first guide columns 21 are respectively connected to the main body 11 and the fixed seat 23, not only improving the connection stability of each first guide column 21, but also enhancing overall structural strength, and promoting the reliability of the peristaltic device 100.

Figure 4:
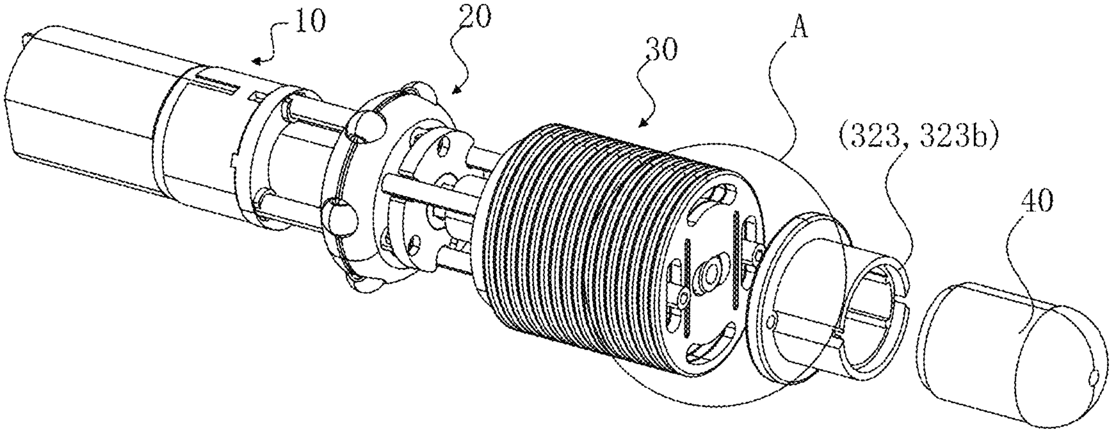
FIG. 4 is a second three-dimensional schematic diagram showing a peristaltic device in a stretching state according to embodiments of the present disclosure.
Figure 5:
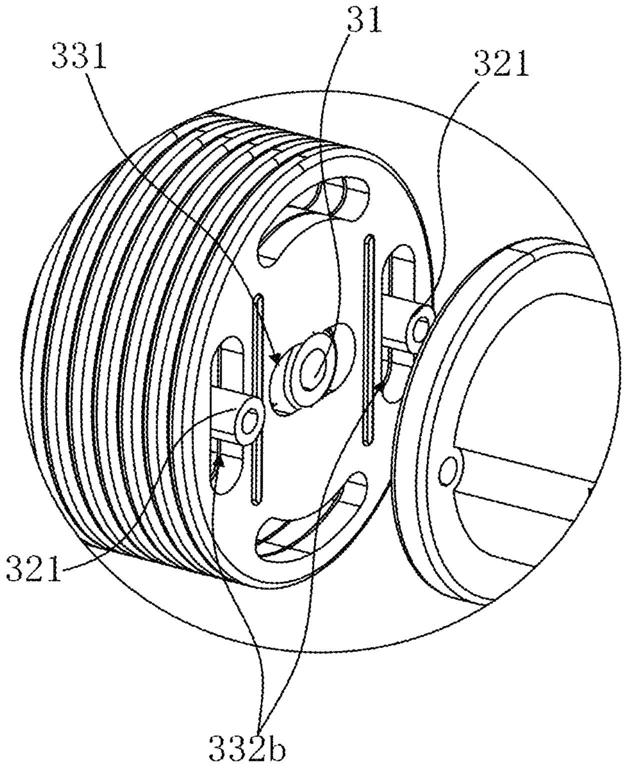
FIG. 5 is a partial enlarged schematic diagram of position A shown in FIG. 4.

With reference to FIG. 4 and FIG. 5, in an embodiment, the transmission rod 31 is spiral. The mounting base 32 includes two second guide columns 321, and the second guide columns 321 extend in the first direction. The peristaltic sheet group 33 includes a plurality of peristaltic sheets 332 arranged in the first direction. Each peristaltic sheet 332 includes a center hole 332*a* and two limiting holes 332*b* respectively located on two sides of the center hole 332*a*, and the center holes 332*a* of the plurality of peristaltic sheets 332 jointly define a connecting portion 331. The transmission rod 31 sequentially passes through the center holes 332*a*, and abuts against walls of the center holes 332*a*. The two limiting holes 332*b* of each peristaltic sheet 332 are respectively sleeved on the corresponding second guide columns 321. With such arrangements, the rotation of the transmission rod 31 can drive the plurality of peristaltic sheets 332 to wriggle, and thus the structural design is simple and reasonable.

Specifically, the center holes 332*a* and the limiting holes 332*b* are all strip-shaped holes, and the extension direction of the center holes 332*a* is perpendicular to the extension direction of the limiting holes 332*b*. The limiting holes 332*b* cooperate with the second guide columns 321 to limit the movement of the peristaltic sheets 332, such that the peristaltic sheets 332 can only move in a direction perpendicular to the first direction. The center holes 332*a* abut against a corresponding part in contact with the spiral transmission rod 31, and the peristaltic sheets 332 move relative to the limiting holes 332*b*. The transmission rod 31 is spiral and can enable the plurality of adjacent peristaltic sheets 332 to be staggered from each other in the direction perpendicular to the first direction in the rotating process, thereby finally achieving a peristaltic motion effect.

Figure 6:
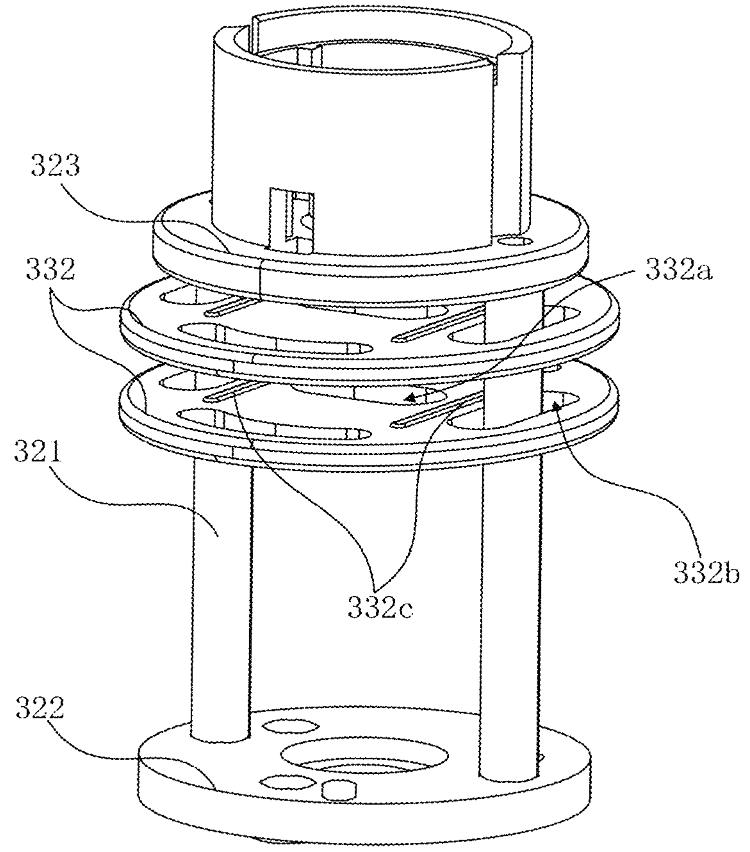
FIG. 6 is a combined schematic diagram showing a mounting base and some peristaltic sheets according to embodiments of the present disclosure.
Figure 7:
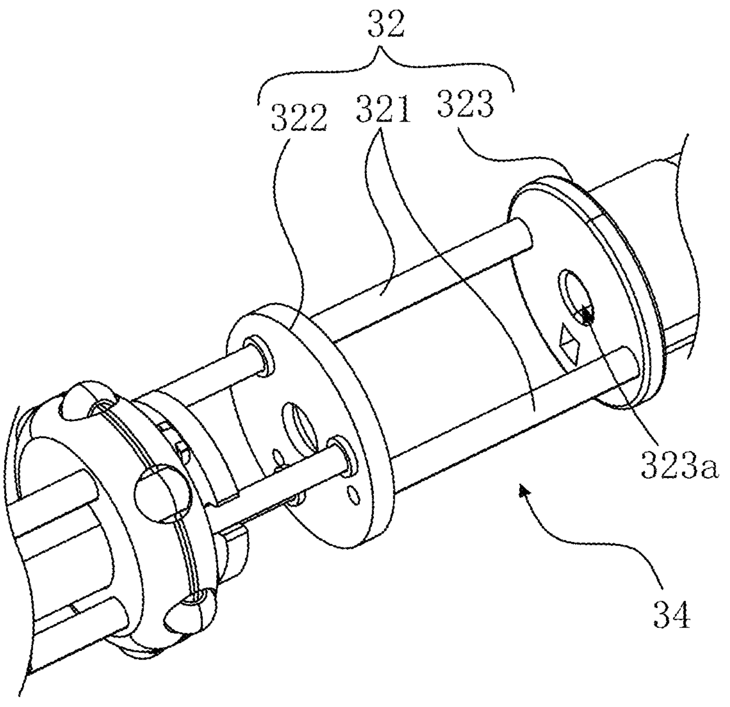
FIG. 7 is a three-dimensional schematic diagram showing a mounting base according to embodiments of the present disclosure.

With reference to FIG. 6 and FIG. 7, in an embodiment, the mounting base 32 further includes a lower blocking cover 322 and an upper blocking cover 323. The lower blocking cover 322 is connected to the sliding seat 20, the second guide columns 321 are disposed between the lower blocking cover 322 and the upper blocking cover 323 to define a limiting space, and the limiting space is configured to mount the peristaltic sheet group 33 in a limiting manner. With such arrangements, the lower blocking cover 322 and the upper blocking cover 323 can limit the plurality of peristaltic sheets 332 in the limiting space, thereby keeping a spacing between the adjacent peristaltic sheets 332, avoiding a larger gap between the adjacent peristaltic sheets 332 in the moving process, improving the peristaltic effect, and making the peristaltic process more coherent and real.

With reference to FIG. 6, in an embodiment, spacers 332*c* are provided on the peristaltic sheets 332, and each spacer 332*c* is located between two adjacent peristaltic sheets 332. With such arrangements, the spacers 332*c* can reduce the contact area between the adjacent peristaltic sheets 332, thereby reducing a friction force caused by relative motion of the adjacent peristaltic sheets 332, and avoiding the jamming of the plurality of peristaltic sheets 332 in the peristaltic process.

Figure 8:
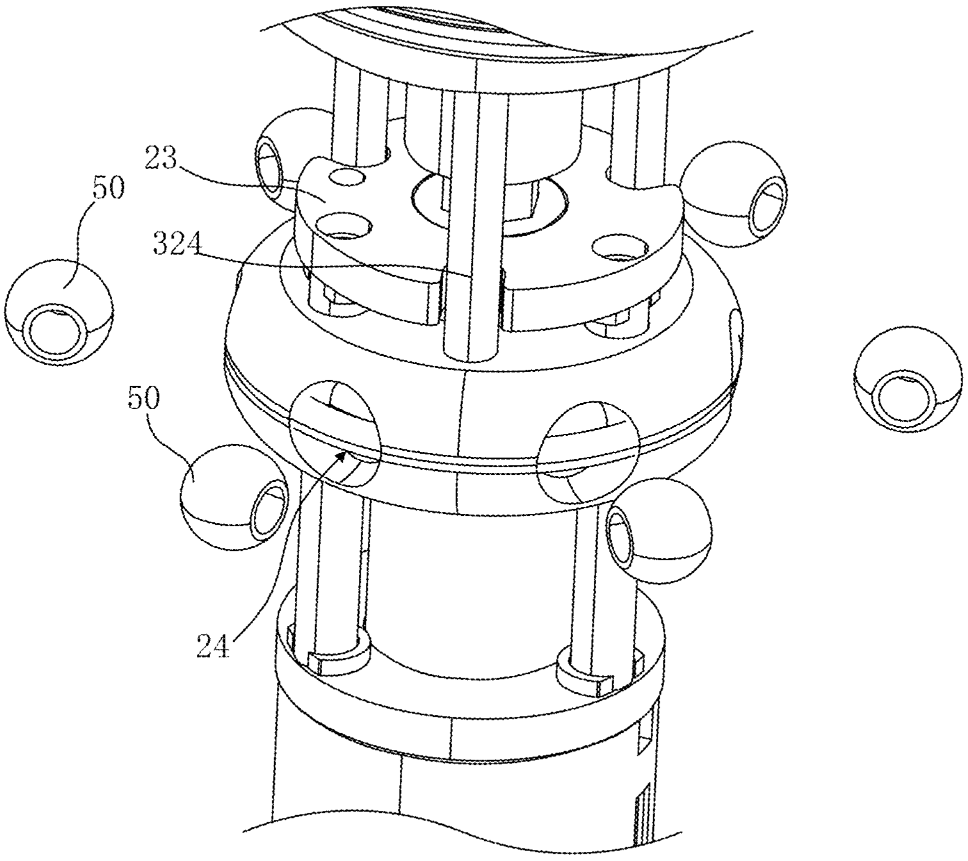
FIG. 8 is a disassembly schematic diagram showing a sliding seat and massage balls according to embodiments of the present disclosure.

With reference to FIG. 8, in an embodiment, the mounting base 32 further includes a plurality of connecting rod 324, and the sliding seat 20 is connected to the lower blocking cover 322 through the connecting rods 324. Specifically, the plurality of connecting rods 324 are arranged around the driving rod 12.

Still referring to FIG. 8, in an embodiment, the peristaltic device 100 further includes a plurality of massage balls 50. The sliding seat 20 includes a peripheral wall pointing to the driving rod 12. A plurality of fixing grooves 24 are provided on the peripheral wall, and the plurality of fixing grooves 24 are arranged at intervals in a circumferential direction of the driving rod 12. The massage balls 50 are rotatably connected to walls of the fixing grooves 24 and are partially exposed outside the fixing grooves 24. With such arrangements, the massage balls 50 can provide a massage touch in the reciprocating motion of the sliding seat 20, thereby further increasing the massage function of the peristaltic device 100, and enriching user experience.

Specifically, in the reciprocating motion of the sliding seat 20, the massage balls 50 generate a friction force when being in contact with the outside, and roll relative to the fixing grooves 24. The rolling of the massage balls 50 can simulate the massage effect of human body massage, which can more directly relieve body fatigue, relax muscles, and improve the comfort of massage.

With reference to FIG. 1, FIG. 2, and FIG. 4, in an embodiment, the peristaltic device 100 further includes a vibrator 40. The vibrator 40 is connected to the mounting base 32, and the vibrator 40 is located on a side of the peristaltic sheet group 33 facing away from the mounting base 32. With such arrangements, the vibrator 40 can enhance the overall massage effect. Vibration can help relax muscles, promote blood circulation, and improve the comfort of massage. Furthermore, by adding the vibrator 40, different massage mode options can be provided for users. The users can adjust the vibration intensity and frequency according to their needs and preferences for a more personalized massage experience.

Specifically, an annular flange 323*b* is provided on the upper blocking cover 323, and the vibrator 40 is mounted in the annular flange 323*b* to improve the connection stability.

With reference to FIG. 7, in an embodiment, a rotating hole 323*a* is further provided on the upper blocking cover 323, and the other end of the transmission rod 31 is rotatably connected into the rotating hole 323*a*. With such arrangements, the rotating stability of the transmission rod 31 can be improved, and the reliability of the peristaltic device 100 is improved during use.

Figure 9:
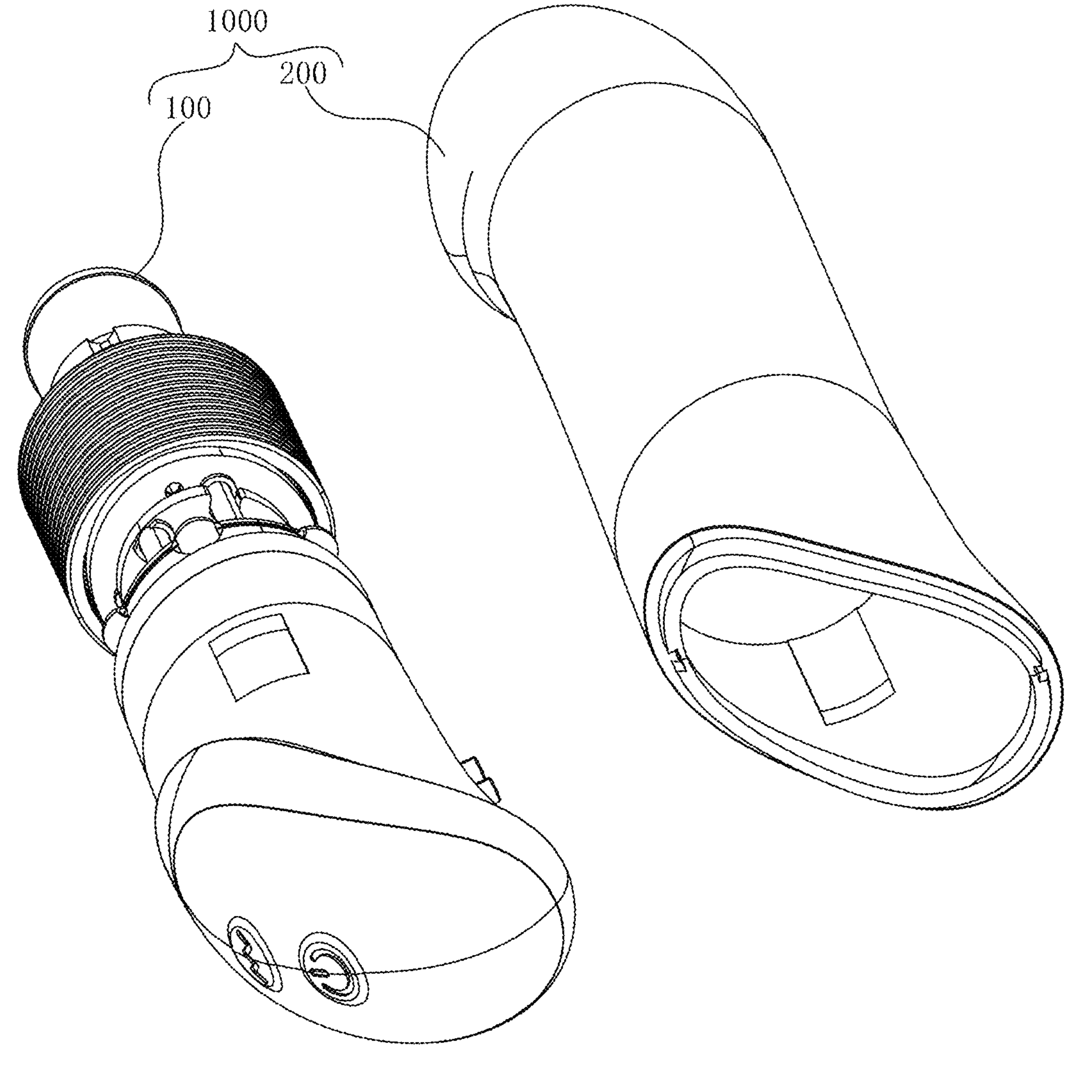
FIG. 9 is a disassembly schematic diagram showing a massager according to embodiments of the present disclosure.

With reference to FIG. 9, the embodiments of the present disclosure further provide a massager 1000. The massager 1000 includes the peristaltic device 100 described in each above embodiment, and a soft casing 200. The soft casing 200 is sleeved outside the peristaltic device 100. With such arrangements, the massager 1000 integrates various massage functions such as peristaltic stretching/retraction, rolling massage, and vibration. The users can choose different massage modes according to their needs and preferences.

This multifunctional design can provide the users with a more comprehensive massage experience. Moreover, the addition of the soft casing 200 not only improves the comfort of the massager 1000 during massage, but also provides the users with a better gripping feeling, making the massager 1000 easier to operate and control. Specifically, the soft casing 200 may be made of a silica gel material.

It should be understood that the above embodiments are only used to explain the technical solution of the present disclosure, not to limit it. For those skilled in the art, the technical solution recorded in the above embodiments may be modified or some of the technical features may be replaced equivalently. All such modifications and substitutions shall fall within the scope of protection of the appended claims the present disclosure.

What is claimed is:

1. A peristaltic device, comprising:

a driving motor, comprising a main body and a driving rod rotatably connected to the main body;

a sliding seat, sleeved on the driving rod; and a peristaltic assembly, comprising a transmission rod, a mounting base, and a peristaltic sheet group, wherein the mounting base is mounted on a side of the sliding seat facing away from the main body, the transmission rod has one end connected to an end of the driving rod away from the main body and another end passing through the mounting base, the peristaltic sheet group is arranged on a side of the mounting base facing away from the sliding seat and is movable on the mounting base along a first direction, the peristaltic sheet group is provided with a connecting portion, and the connecting portion is inserted into and is connected between two ends of the transmission rod; and the driving rod is configured to rotate relative to the main body, such that the sliding seat drives the peristaltic assembly to move in the first direction, and the transmission rod rotates and drives the peristaltic sheet group to wriggle.

2. The peristaltic device according to claim 1, wherein a spiral sliding groove is provided on the driving rod, and a driving member matching the sliding groove is provided on the sliding seat.

3. The peristaltic device according to claim 1, wherein the sliding seat comprises a plurality of first guide columns and a seat body, the seat body and the plurality of first guide columns are all arranged around the driving rod, the first guide columns are mounted on the main body and extend in the first direction, and the seat body is slidably connected to the plurality of first guide columns.

4. The peristaltic device according to claim 1, wherein the transmission rod is spiral; the mounting base comprises two second guide columns, and the second guide columns extend in the first direction; the peristaltic sheet group comprises a plurality of peristaltic sheets arranged in the first direction, each peristaltic sheet comprises a center hole and two limiting holes respectively located on two sides of the center hole, and the center holes of the plurality of peristaltic sheets jointly define the connecting portion; the center holes are sequentially sleeved on the transmission rod; and the two limiting holes of each peristaltic sheet are respectively sleeved on the corresponding second guide columns.

5. The peristaltic device according to claim 4, wherein the mounting base further comprises a lower blocking cover and an upper blocking cover, the lower blocking cover is connected to the sliding seat, the second guide columns are disposed between the lower blocking cover and the upper blocking cover to define a limiting space, and the limiting space is configured to mount the peristaltic sheet group in a limiting manner.

6. The peristaltic device according to claim 1, further comprising a plurality of massage balls, wherein the sliding seat comprises a peripheral wall facing away from the driving rod, a plurality of fixing grooves are provided on the peripheral wall, the plurality of fixing grooves are arranged at intervals in a circumferential direction of the driving rod, and the massage balls are rotatably connected to walls of the fixing grooves and are partially exposed outside the fixing grooves.

7. The peristaltic device according to claim 1, further comprising a vibrator, wherein the vibrator is connected to the mounting base, and the vibrator is located on a side of the peristaltic sheet group facing away from the mounting base.

8. The peristaltic device according to claim 4, further comprising a vibrator, wherein the vibrator is connected to the mounting base, and the vibrator is located on a side of the peristaltic sheet group facing away from the mounting base.

9. The peristaltic device according to claim 5, further comprising a vibrator, wherein the vibrator is connected to the mounting base, and the vibrator is located on a side of the peristaltic sheet group facing away from the mounting base.

10. The peristaltic device according to claim 4, wherein spacers are provided on the peristaltic sheets, and each spacer is located between two adjacent peristaltic sheets.

11. The peristaltic device according to claim 5, wherein a rotating hole is further provided on the upper blocking cover, and the another end of the transmission rod is rotatably connected into the rotating hole.

12. A massager, comprising the peristaltic device according to claim 1 and a soft casing, wherein the soft casing is sleeved outside the peristaltic device.

13. The massager according to claim 12, wherein a spiral sliding groove is provided on the driving rod, and a driving member matching the sliding groove is provided on the sliding seat.

14. The peristaltic device according to claim 12, wherein the sliding seat comprises a plurality of first guide columns and a seat body, the seat body and the plurality of first guide columns are all arranged around the driving rod, the plurality of first guide columns are mounted on the main body and extend in the first direction, and the seat body is slidably connected to the plurality of first guide columns.

15. The peristaltic device according to claim 12, wherein the transmission rod is spiral; the mounting base comprises two second guide columns, and the second guide columns extend in the first direction; the peristaltic sheet group comprises a plurality of peristaltic sheets arranged in the first direction, each peristaltic sheet comprises a center hole and two limiting holes respectively located on two sides of the center hole, and the center holes of the plurality of peristaltic sheets jointly define the connecting portion; the center holes are sequentially sleeved on the transmission rod; and the two limiting holes of each peristaltic sheet are respectively sleeved on the corresponding second guide columns.

16. The peristaltic device according to claim 15, wherein the mounting base further comprises a lower blocking cover and an upper blocking cover, the lower blocking cover is connected to the sliding seat, the second guide columns are disposed between the lower blocking cover and the upper blocking cover to define a limiting space, and the limiting space is configured to mount the peristaltic sheet group in a limiting manner.

17. The peristaltic device according to claim 12, further comprising a plurality of massage balls, wherein the sliding seat comprises a peripheral wall facing away from the driving rod, a plurality of fixing grooves are provided on the peripheral wall, the plurality of fixing grooves are arranged at intervals in a circumferential direction of the driving rod, and the massage balls are rotatably connected to walls of the fixing grooves and are partially exposed outside the fixing grooves.

18. The peristaltic device according to claim 12, further comprising a vibrator, wherein the vibrator is connected to the mounting base, and the vibrator is located on a side of the peristaltic sheet group facing away from the mounting base.

19. The peristaltic device according to claim 15, wherein spacers are provided on the peristaltic sheets, and each spacer is located between two adjacent peristaltic sheets.

20. The peristaltic device according to claim 16, wherein a rotating hole is further provided on the upper blocking cover, and the another end of the transmission rod is rotatably connected into the rotating hole.

* * * * *